(12) United States Patent
Wuerpel (10) Patent No.: US 10,100,855 B2
(45) Date of Patent: Oct. 16, 2018

(54) PULSATION DAMPING SYSTEM

(71) Applicant: J. WAGNER GMBH, Markdorf (DE)

(72) Inventor: Hartmut Wuerpel, Markdorf (DE)

(73) Assignee: J. Wagner GmbH, Markdorf (DE)

( * ) Notice: Subject to any disclaimer, the term of this patent is extended or adjusted under 35 U.S.C. 154(b) by 190 days.

(21) Appl. No.: 15/193,565

(22) Filed: Jun. 27, 2016

(65) Prior Publication Data

US 2017/0009928 A1    Jan. 12, 2017

(30) Foreign Application Priority Data

Jul. 6, 2015 (DE) .................. 10 2015 110 883

(51) Int. Cl.
| | |
|---|---|
| *F16L 55/04* | (2006.01) |
| *F15D 1/02* | (2006.01) |
| *F04B 11/00* | (2006.01) |
| *F04B 15/02* | (2006.01) |
| *F04B 23/00* | (2006.01) |
| *F16L 55/053* | (2006.01) |
| *B05C 11/10* | (2006.01) |

(52) U.S. Cl.
CPC .............. *F15D 1/02* (2013.01); *F04B 11/00* (2013.01); *F04B 11/0008* (2013.01); *F04B 11/0016* (2013.01); *F04B 11/0033* (2013.01); *F04B 11/0091* (2013.01); *F04B 15/02* (2013.01); *F04B 23/00* (2013.01); *B05C 11/1047* (2013.01); *F16L 55/04* (2013.01); *F16L 55/053* (2013.01)

(58) Field of Classification Search
CPC ....... F16L 55/04; F16L 55/041; F16L 55/043; F16L 55/045; F16L 55/05; F16L 55/053; F15B 2201/31; F15B 1/24
USPC ............................... 138/26, 30, 31
See application file for complete search history.

(56) References Cited

U.S. PATENT DOCUMENTS

| 5,353,840 A * | 10/1994 | Paley ............... F16L 55/033 138/30 |
| 5,803,555 A * | 9/1998 | Schaefer ........... B60T 8/368 138/30 |
| 7,240,696 B2 * | 7/2007 | Schlitzkus ........ B60T 8/4068 138/26 |

FOREIGN PATENT DOCUMENTS

DE    87 15 311 U    1/1988

* cited by examiner

*Primary Examiner* — Patrick F Brinson
(74) *Attorney, Agent, or Firm* — Burr & Brown, PLLC (57) ABSTRACT

The present invention relates to a pulsation damping system for a paint spray device for spraying paint including a pulsation damper for damping the pulsation of a paint stream, wherein the pulsation damper includes a housing, a chamber, a chamber inlet, a chamber outlet and a damping means. In this connection, an opening of the chamber outlet comprises a cross sectional area which is smaller than a cross sectional area of an opening of the chamber inlet, and as a result forms a throttle.

18 Claims, 8 Drawing Sheets

PULSATION DAMPING SYSTEM

This application claims the benefit under 35 USC § 119(a)-(d) of German Application No. 10 2015 110 883.6 filed Jul. 6, 2015, the entirety of which is incorporated herein by reference.

FIELD OF THE INVENTION

The present invention relates to a pulsation damping system as well as to a paint spray device.

BACKGROUND OF THE INVENTION

DE 87 15 311 U1 discloses a pulsation damping system for a paint spray device for spraying paint which includes a pulsation damper for damping the pulsation of a paint stream, the pulsation damper including a housing, a chamber, a chamber inlet, a chamber outlet and a damping means.

SUMMARY OF THE INVENTION

The object underlying the present invention is to develop a pulsation damping system or a paint spray device which is simple or small in construction and which reduces both high-frequency and low-frequency pressure fluctuations.

In the case of the pulsation damping system according to the present invention for a paint spray device for spraying paint, an opening of the chamber outlet is realized with a cross sectional area which is smaller than a cross sectional area of an opening of the chamber inlet. In a simple manner this forms a throttle, which damps the pulsation of the paint stream without at the same time forming a fairly large volume pressure accumulator which leads, during cleaning, to undesirably large amounts of paint which have to be disposed of without being used. The pressure accumulator having a small volume also prevents larger amounts of paint leaking once the paint spray device has been shut down if a spray head is actuated when the pump has been switched off. A pressure at the paint pump is also able to be reduced rapidly when the volume of the pressure accumulator is small.

Furthermore, it is provided to realize the cross sectional area of the opening of the chamber outlet at least 50% smaller than the cross sectional area of the opening of the chamber inlet. The desired damping is obtained to a sufficient extent in this manner.

It is also provided to equip the pulsation damper with a diaphragm which divides the chamber into a paint area, which is traversed by paint, and a spring and damping area, wherein the chamber inlet and the chamber outlet are connected to the paint area. By arranging a diaphragm in the pulsation damper, it is possible to increase the efficiency thereof further and, in particular, also to damp high frequency and low amplitude fluctuations such that it is also possible to reduce unwanted shaking of a hose leading to a spray head.

In addition, it is provided to equip the spring and damping area with a spring means which first and foremost forms a flexible energy storage unit, and/or with a damper which first and foremost forms an energy absorbing means, wherein the spring means includes, in particular, a gas filling and/or a mechanical spring and wherein the damper includes, in particular, a plastics material which absorbs pressure energy, such as preferably an open-pore or closed-pore plastics material body and in particular foam material or a rubber body. Using such spring and damping means, the pulsation damping system is able to be designed for a desired performance. A helical spring is also provided in particular as spring means in this connection.

It is also provided to realize the diaphragm as a disk-shaped diaphragm. These types of diaphragms are available in a cost-efficient manner as standard components. It is provided, in particular, in this connection, to realize the diaphragm as a circular disk diaphragm. By using a diaphragm of this type, it is possible to design the pulsation damping system in a compact manner.

It is also provided to connect the chamber inlet and the chamber outlet by a channel, the channel being realized in such a manner on the diaphragm and/or on the housing that a passage for paint is present through the chamber irrespective of the position of the diaphragm or in a manner that is not able to be blocked by the diaphragm. This ensures that the pulsation damping system is not able to block a stream of paint fully even if the paint stream is at a low pressure or if the spring means are too strong.

Furthermore, the pulsation damper is provided with an adjusting device, by means of which a spring force of the pulsation damper is pre-adjustable. This makes it possible simply by adjusting the spring force to adapt the pulsation damper to paint pumps of different performance and/or different design. A refilling device and preferably a refill valve, by means of which a gas filling is modifiable, is provided in particular as an adjusting device. This makes it possible within the framework of a service to check that the gas pressure is at its required value and to produce the same. In addition, this also makes it possible to operate the pulsation damping system on paint pumps with different performance levels and/or pump characteristics and to adapt the damping characteristics of the pulsation damper to the same.

It is also provided to equip the pulsation damping system with a second pulsation damper, wherein the second pulsation damper also includes a housing, a chamber, a chamber inlet, a chamber outlet and a damping means. By means of a second pulsation damper, it is possible to increase the damping performance of the pulsation damping system without having to modify the design of the pulsation damper. In addition, a storage volume of the pulsation damping system is also able to be kept small in this way. The use of at least two pulsation dampers or two diaphragms connected in parallel makes a very compact method of operation possible with a very small gas volume. The division of the flow into at least two paint areas assures the operation of the pulsation damping system in the event of a fault in one of the pulsation dampers as a result of redundancy.

It is also provided to equip the pulsation damping system with at least three pulsation dampers, wherein the third pulsation damper and each further pulsation damper also includes a housing, a chamber, a chamber inlet, a chamber outlet and a damping means. The damping performance can be increased further using identical parts as a result.

Irrespective of the number of pulsation dampers used, it is provided to incorporate the same into the paint stream in parallel with one another.

It is further provided to equip the pulsation damping system with a first paint line connection, a first distribute point, a first collect point and a second paint line connection, wherein the chamber inlet of the first pulsation damper and the chamber inlet of each further pulsation damper are connected to the first distribute point and wherein the chamber outlet of the first pulsation damper and the chamber outlet of each further pulsation damper are connected to the first collect point. A particularly compact design of pulsation damping systems with at least two pulsation dampers is made possible in this manner.

Furthermore, it is provided to equip the pulsation damping system with a second distribute point and a second collect point, wherein a filter inlet of at least one filter is connected to the second distribute point and wherein a filter outlet of the at least one filter is connected to the second collect point. As a result it is possible to equip the pulsation damping system with a filter whist retaining a compact design. It is provided to arrange the second distribute point and the second collect point in front of the first distribute point and the first collect point in the direction of flow of the paint stream. As a result, the paint conveyed by the paint pump is cleaned by the filter or the filters before it flows through the pulsation damper or dampers such that the pulsation damper or dampers is/are effectively prevented from becoming clogged. Insofar as the pulsation damping system only includes one filter, it is also provided to design the second distribute point or the second collect point in each case as a junction. To provide the possibility of connecting at least one further filter, it is also provided that junctions of the second collect point and of the second distribute point, which are provided for the connection of the further filter or of the further filters, are closed by closure means. In this connection, the closure means is or are removable for attaching the further filter or the further filters.

It is also provided to arrange the pulsation dampers symmetrically to one another and in particular located opposite one another. The arrangement leads to a compact design which saves on parts where identical parts are able to be used for the pulsation dampers.

The paint spray device according to the present invention, which includes a paint container, a paint pump, a paint hose, a spray head and a pulsation damping system, is realized with a pulsation damping system according to the present invention and consequently comprises the advantages named there.

Finally, it is provided to realize the paint spray device such that the pulsation damping system is arranged between the paint pump and the paint hose.

BRIEF DESCRIPTION OF THE DRAWINGS

Further details of the invention are described by way of schematically shown exemplary embodiments in the drawing, in which.

DETAILED DESCRIPTION OF THE INVENTION

Figure 1:
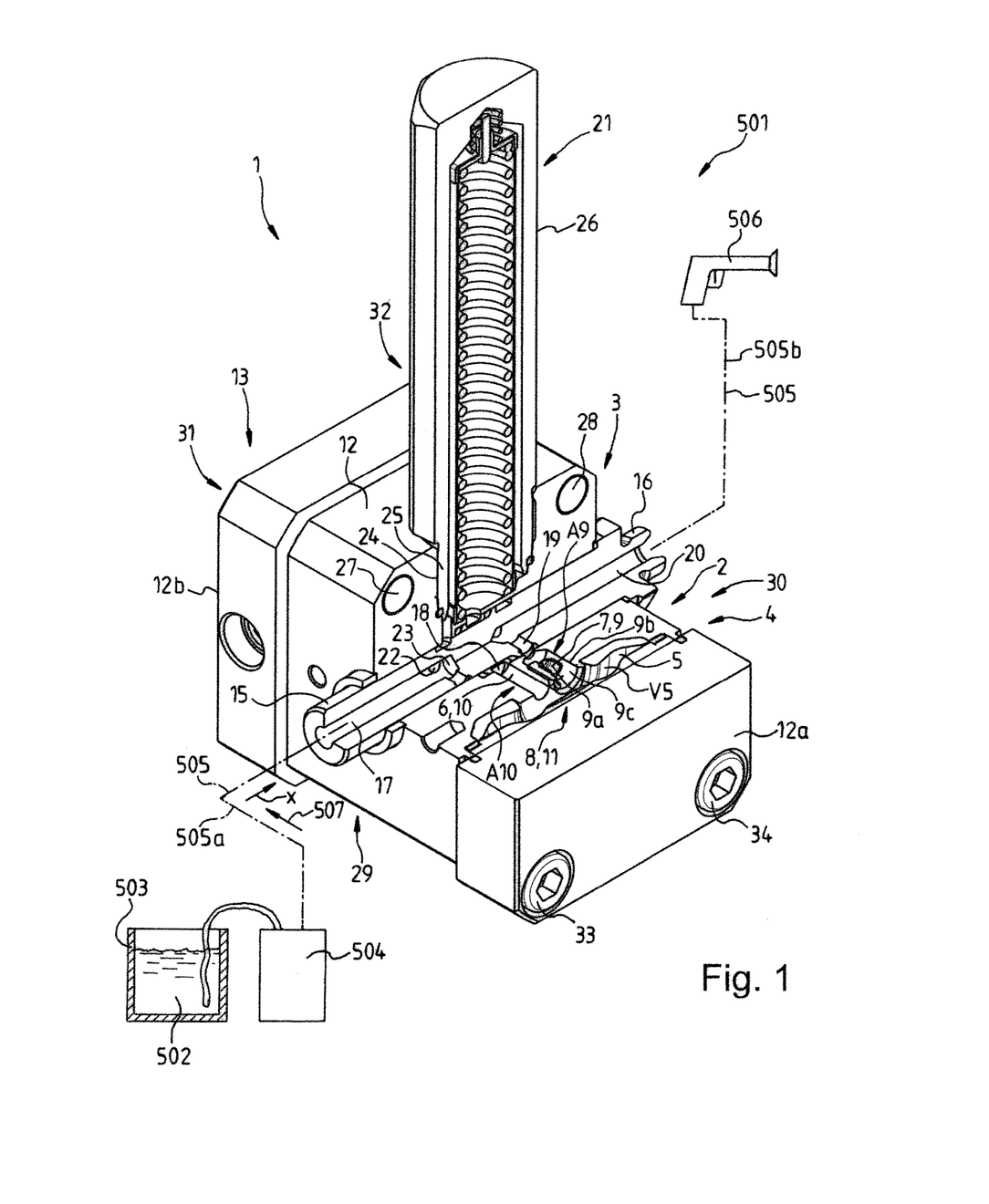
FIG. 1 shows a perspective, part-cutaway view of a first realization variant of a pulsation damping system, the cut surfaces being shown without hatching.

FIG. 1 shows a perspective and part-cutaway view of a pulsation damping system 1 according to the present invention. Cut surfaces are not hatched in the representation to retain clarity.

The pulsation damping system 1 is a component part of a paint spray device 501 for spraying paint 502 which is shown schematically in FIG. 1. Along with the pulsation damping system 1, the paint spray device 501 includes a paint container 503, a paint pump 504, a paint hose 505 and a spray head 506. In this connection, a first portion 505*a* of the paint hose 505 leads from the paint pump 504 to the pulsation damping system 1 and a second portion 505*b* of the paint hose 505 leads from the pulsation damping system 1 to the spray head 506. The pulsation damping system 1 includes a pulsation damper 2. The pulsation damper serves for damping the pulsation of a paint stream 507 flowing from the paint pump 504 to the spray head 505. The pulsation of the paint stream 507 is determined essentially by the frequency at which the paint pump 504 operates. In this connection, high-pressure paint pumps, which are realized as fast running diaphragm pumps, operate at a pump frequency of between approximately 12 Hz and 25 Hz. In this connection, high-pressure paint pumps, which are realized as slow running piston pumps, operate at a pump frequency of between 0.1 Hz and 3 Hz. Pulsation damping is necessary in order to reduce or to avoid vibrations at the spray head 506, which can also be realized as a gun, and thus to comply with the health and safety regulations, in particular, and to increase comfort. In addition, independent movement of the paint hose 505 can also be avoided by pulsation damping in order to prevent, in particular, wear on the paint hose 505 caused by constant slipping back and forth or chafing on rough surfaces.

The pulsation damper 2 includes—as does a second pulsation damper 3 which is located opposite the first in a mirror-inverted manner—a housing 4, a chamber 5, a chamber inlet 6, a chamber outlet 7 and a damping means 8. In this connection, an opening 9 of the chamber outlet 7 comprises a cross sectional area A9 which is smaller than a cross sectional area A10 of an opening 10 of the chamber inlet 6.

The damping means 8, in the case of the first realization variant shown in FIG. 1, is formed just by the chamber inlet 6, the chamber 5 and the chamber outlet 7 and operates as a damping throttle 11. As a component which determines the cross sectional area A9 of the opening 9, the chamber outlet 7 includes, in this connection, a throttle nozzle 9*a* which is screwed into a passage 9*b* with internal thread 9*c*. As a result of changing the throttle nozzle 9*a*, it is possible to adapt the characteristics of the pulsation damper 2 to a spray nozzle used on the spray head 506 and/or paint pumps with different characteristics.

The housing 4 of the first pulsation damper 2 includes a system block 12 and a cover 12*a*. A housing 13 of the second pulsation damper 3 is formed from the same system block 12 and from a further cover 12*b*. The system block 12 includes a first paint line connection 15, to which the paint pump 504 is connected, and a second paint line connection 16 to which the spray head 506 is connected.

According to a realization variant that is not shown, the pulsation damping system is constructed in the paint pump or is directly connected to the paint pump.

With the pulsation damping system 1 operating, the paint 502 flows from the paint line connection 15—as shown in FIG. 1—through a channel 17 up to a first distribute point 18 and is directed from the first distribute point into the two pulsation dampers 2, 3 which are connected in parallel. In this connection, only the path of the paint 502 through the first pulsation damper 2 is described below. Approximately half the volume of the paint stream 507 flows from the first distribute point 18 through the chamber inlet 6 into the chamber 5 and from there further through the chamber outlet 7 into a first collect point 19 and from the collect point by means of a second channel 20 of the system block 12 to the second paint line connection 16, to which the spray head 506 is connected by means of the second portion 505b of the paint hose 505. The throttle effect is determined by the ratio between the cross sectional area A10 of the chamber inlet 6 and the reduced cross sectional area A9 of the chamber outlet 7 and a volume V5 of the chamber 5 which is located in between.

The already mentioned second pulsation damper 3 is realized in an analogous manner to the first pulsation damper 2 such that the paint stream 507 running through the pulsation damping system 1 emerges out of the pulsation damping system 1 fully treated.

FIG. 1 shows another filter 21 as an optional component. The filter 21 is connected to the channel 17 via a second distribute point 22, which is arranged in front of the first distribute point 18 in the direction flow x. The entire paint stream 507 is guided through the filter 21 and then re-enters into the first channel 17 by means of a second collect point 23, which is arranged in the first channel 17 between the second distribute point 22 and the first distribute point 18. In this connection, the channel 17 is closed between the second distribute point 22 and the second collect point 23 such that the entire paint stream is guided through the filter 21. The channel is also interrupted between the first distribute point and the first collect point. The filter 21 is screwed into a filter flange 24 of the system block 12 by way of a lower end 25 of its filter housing 26 such that it is able to be replaced in a rapid manner.

According to a realization variant not shown, it is also provided to arrange a second filter opposite the first filter, the system block including a further filter flange for the second filter and the filter also being connected to the second distribute point and the second collect point.

The system block 12 comprises four through-bores 27, 28, 29 and 30, through which the covers 12a, 12b are screw-connected by way of connecting means 31, 32, 33 and 34 in such a manner in relation to one another that the covers 12a, 12b close the chambers 5. The connecting means 31 to 34 are formed in each case by a screw and a nut or by a screw and an internal thread which is realized in one of the covers. The two pulsation dampers are screw-connected using one set of connecting means, the load for the connecting means does not increase as a result.

Figure 2:
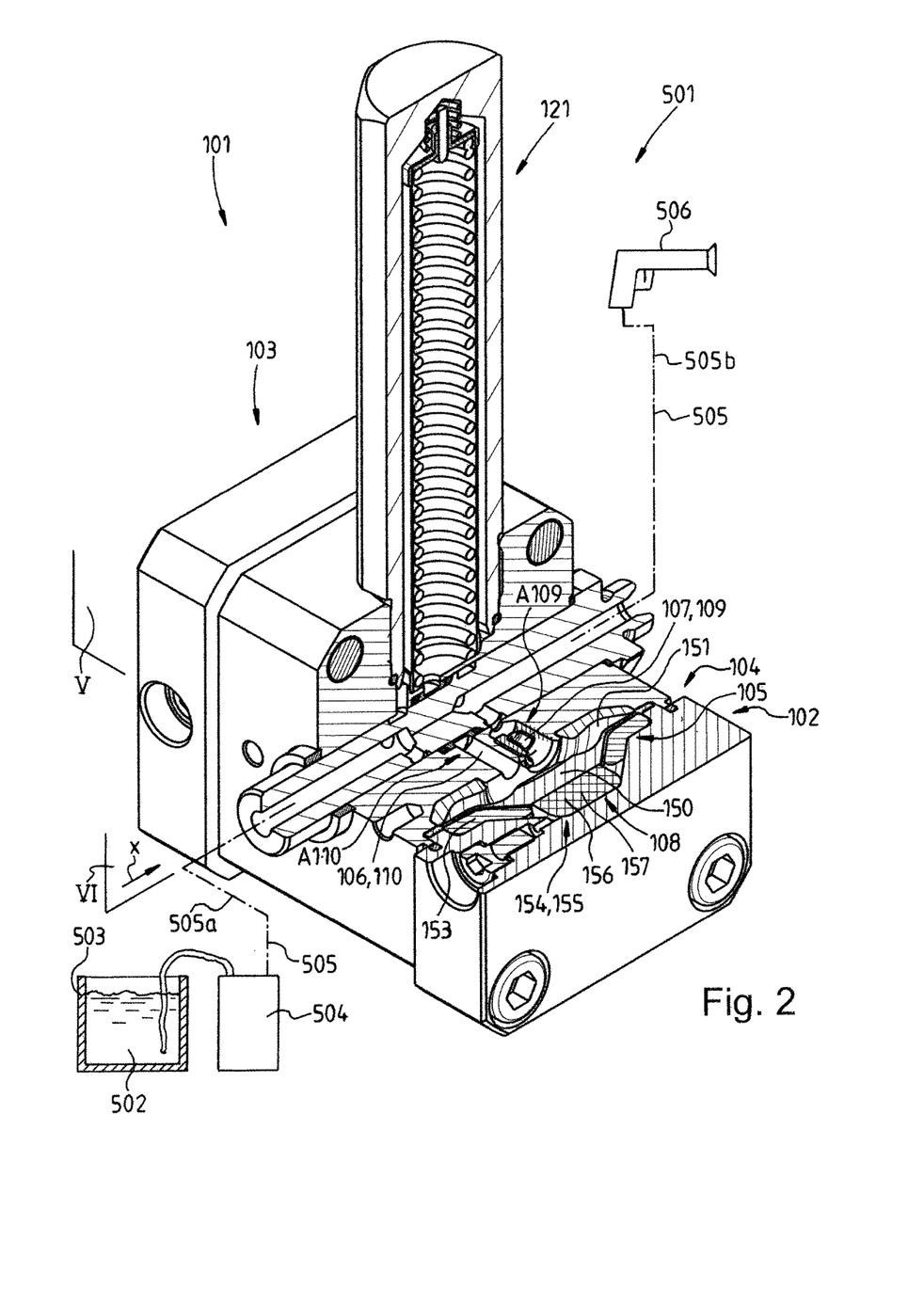
FIG. 2 shows a perspective, part-cutaway view of a second realization variant of a pulsation damping system, the cut surfaces being hatched.
Figure 3:
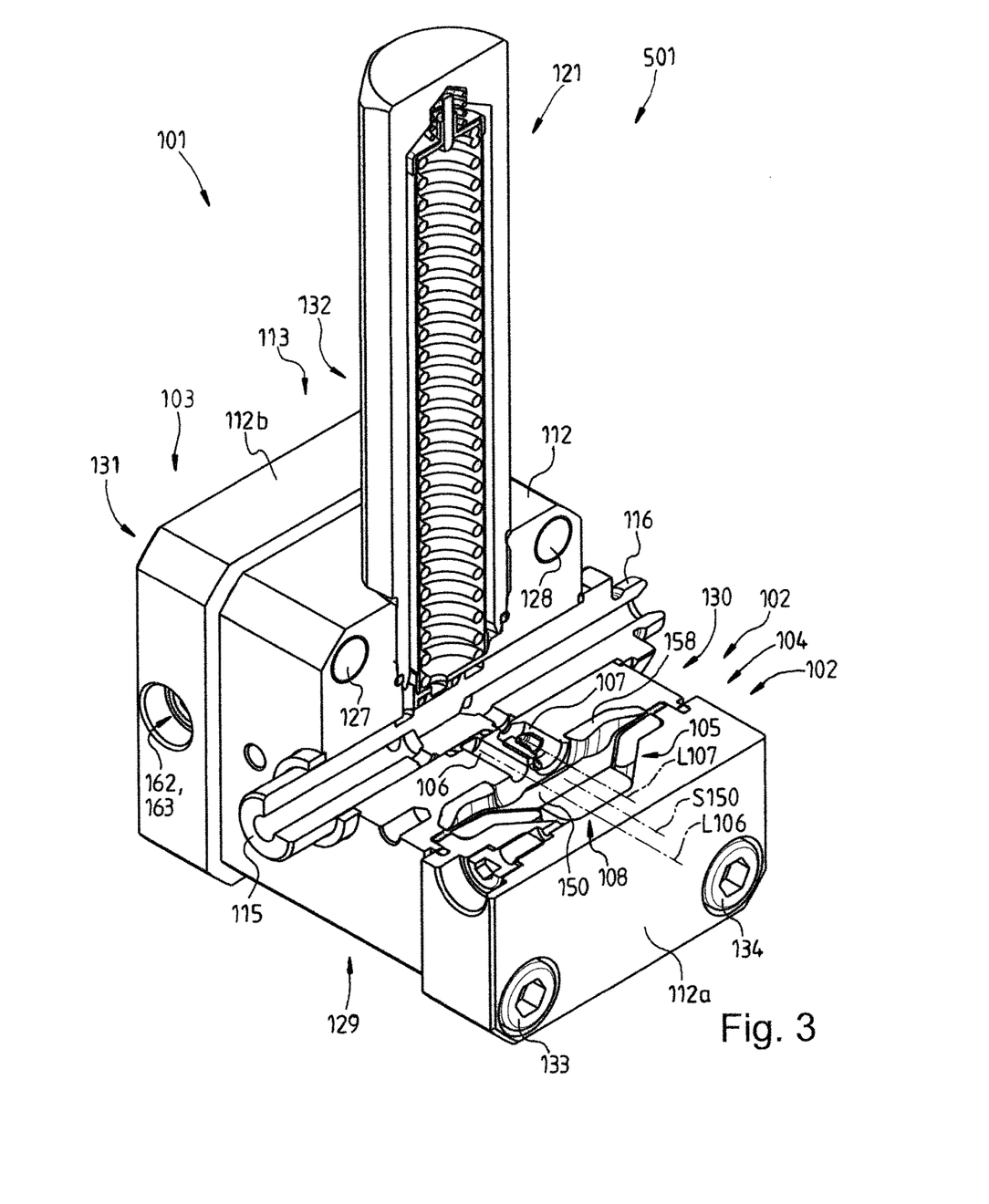
FIG. 3 shows the representation in FIG. 2 with non-hatched cut surfaces.
Figure 4:
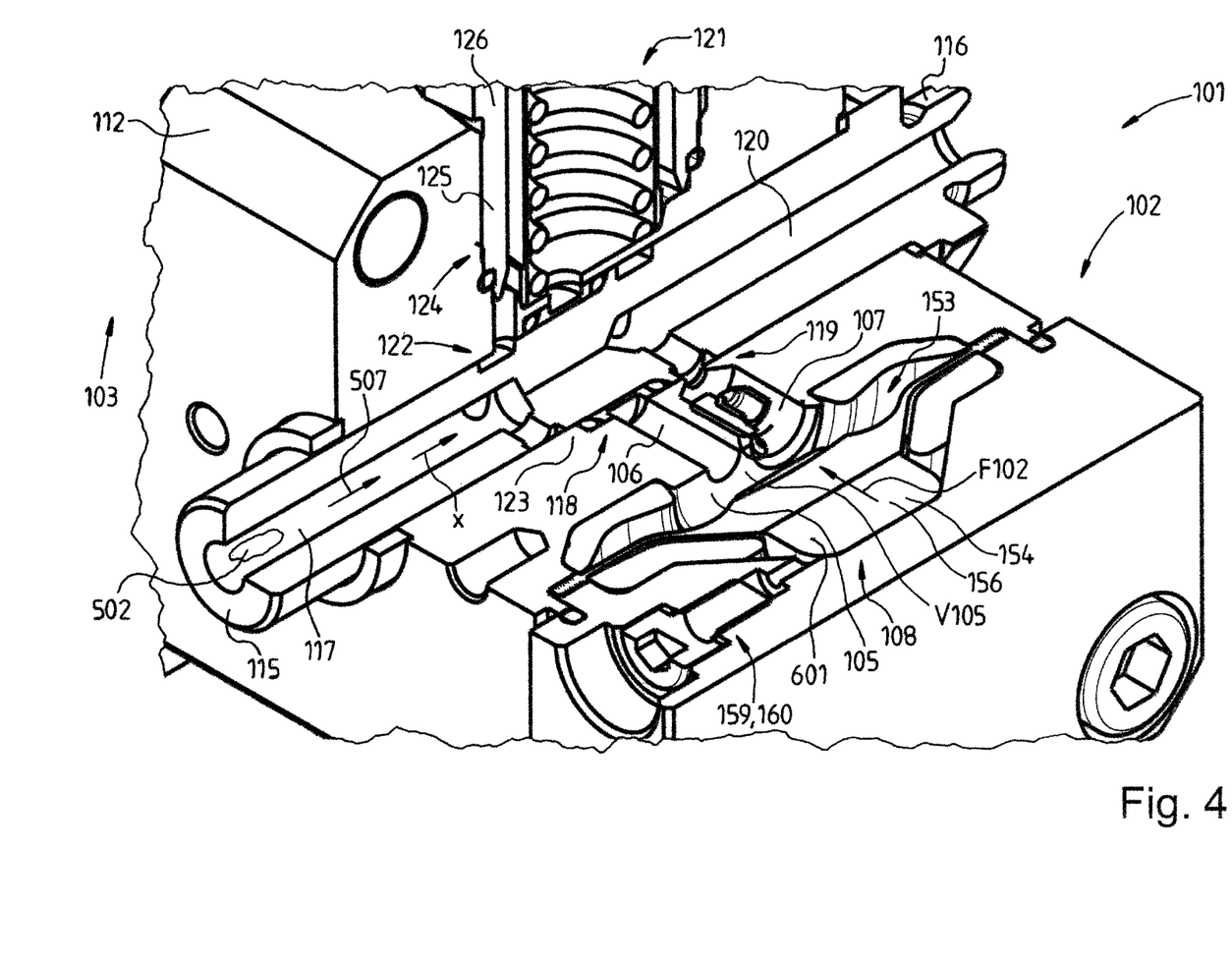
FIG. 4 shows a view of a detail in FIG. 3 in the region of a pulsation damper.
Figure 5:
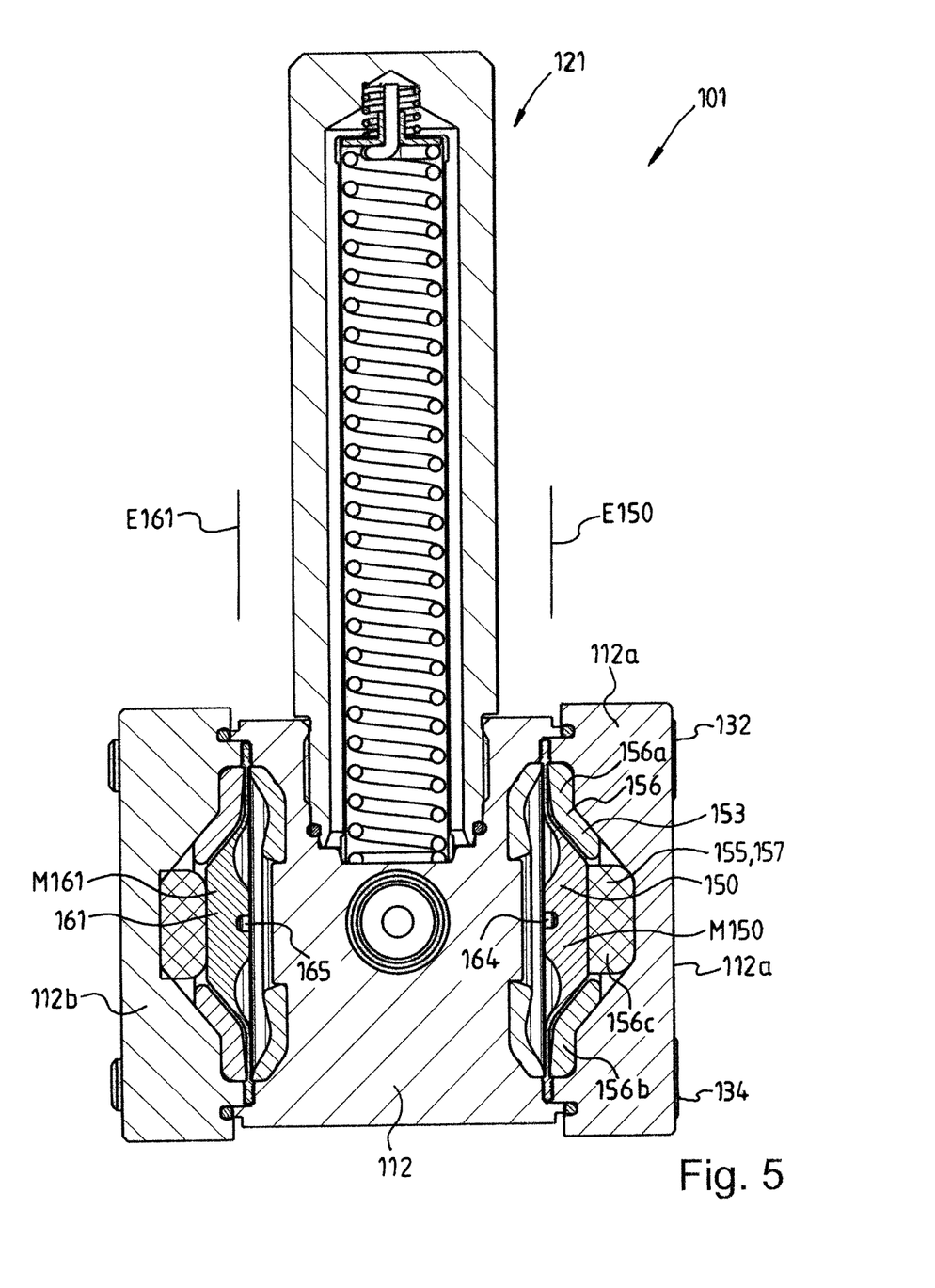
FIG. 5 shows a cross section through FIG. 2 corresponding to the cutting plane V shown there.
Figure 6:
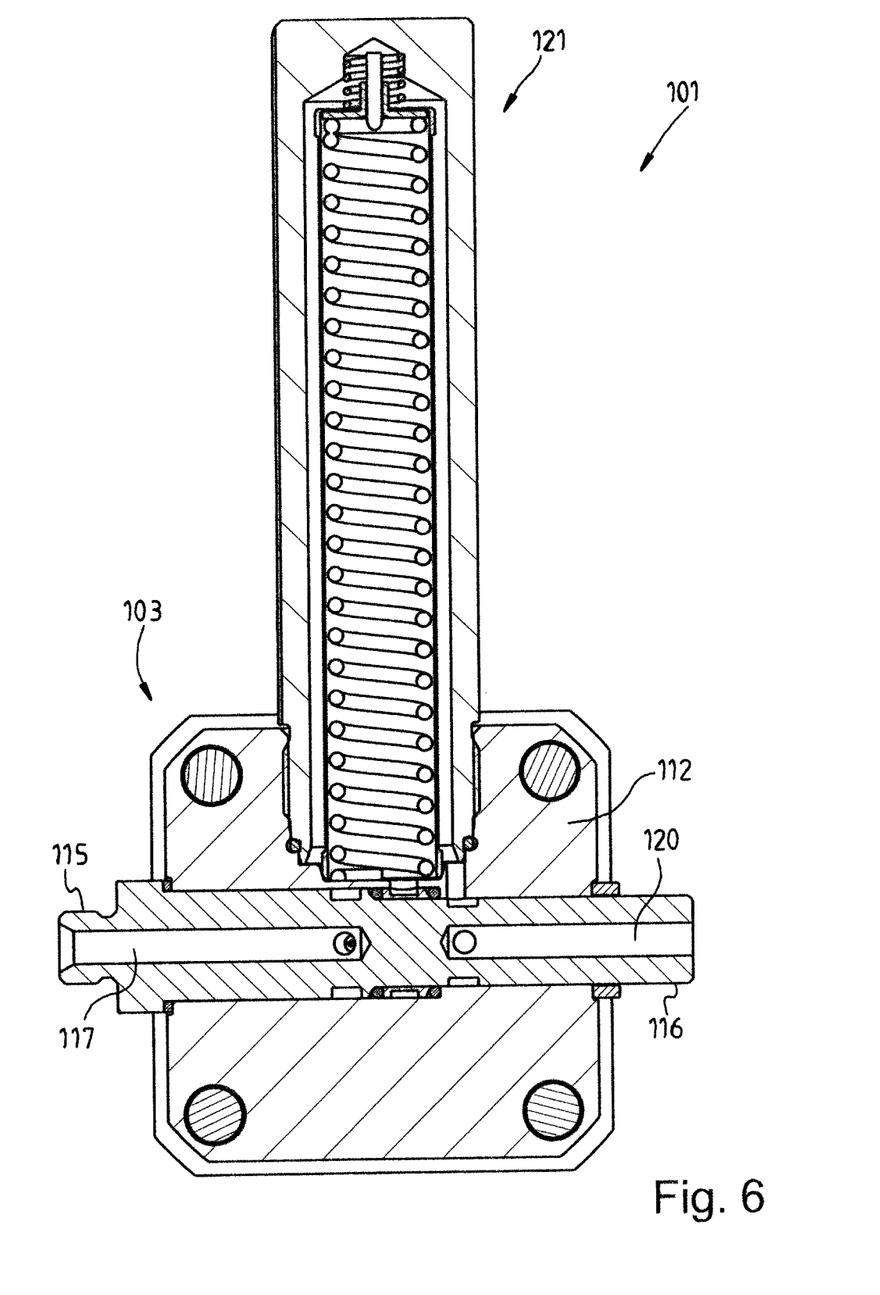
FIG. 6 shows a longitudinal section through FIG. 2 corresponding to the cutting plane VI shown there.

FIG. 2 shows a perspective, part-cutaway view of a second realization variant of a pulsation damping system 101 according to the invention. The cut surfaces are hatched in the representation. For better understanding, FIG. 3 shows the representation in FIG. 2 without hatching on the cut surfaces and FIG. 4 shows a view of another detail in FIG. 3 in the region of a first pulsation damper 102. FIGS. 5 and 6 show further sections through the second realization variant of the pulsation damping system 101.

The pulsation damping system 101 is a component part of a paint spray device 501 for spraying paint 502 which is shown schematically in FIG. 2. Along with the pulsation damping system 101, the paint spray device 501 includes a paint container 503, a paint pump 504, a paint hose 505 and a spray head 506. In this connection, a first portion 505a of the paint hose 505 leads from the paint pump 504 to the pulsation damping system 101 and a second portion 505b of the paint hose 505 leads from the pulsation damping system 101 to the spray head 506. The pulsation damping system 101 includes a pulsation damper 102. The pulsation damper serves for damping the pulsation of a paint stream 507 flowing from the paint pump 504 to the spray head 505.

The pulsation damper 102 includes—as does a second pulsation damper 103 which is located opposite the first in a mirror-inverted manner—a housing 104, a chamber 105, a chamber inlet 106, a chamber outlet 107 and a damping means 108. In this connection, an opening 109 of the chamber outlet 107 comprises a cross sectional area A109 which is smaller than a cross sectional area A110 of an opening 110 of the chamber inlet 106.

The damping means 108, in the case of the first realization variant shown in FIG. 2, is formed not only by the chamber inlet 106, the chamber 105 and the chamber outlet 177, but also includes a diaphragm 150 which divides the chamber 105 into a paint area 151 which is traversed by paint 502 and a spring and damping area 153, the chamber inlet 106 and the chamber outlet 107 being connected to the paint area 151. The spring and damping area 153 is also designated as a gas area and includes a spring means 154 and a damper 155 as component parts of the damping means 108. The spring means 154 is formed by a gas filling 156. The damper 155 is formed by a porous plastics material body 157. The diaphragm 150 is supported against the paint area 151 by the gas filling 156 and by the porous plastics material body 156, which receives gas. The diaphragm 150 is once again realized as a disk-shaped diaphragm which is circular in top view and stands with its axis of symmetry S150 parallel to a longitudinal axis L106 of the chamber inlet 106 and to a longitudinal axis L107 of the chamber outlet 107 (see FIG. 3). Consequently, in-flowing paint 502 falls in a perpendicular manner onto a deflector surface 158 of the diaphragm 150 (see FIG. 3).

According to a realization variant which is not shown, it is also provided to arrange other spring means and dampers or to arrange only one spring means or to arrange only one damping means in the spring and damping area. Depending on the design of the diaphragm, the diaphragm itself already forms a damper.

As can be seen, for example, from FIG. 3, the housing 104 of the first pulsation damper 102 includes a system block 112 and a cover 112a. A housing 113 of the second pulsation damper 103 is formed from the same system block 112 and from a further cover 112b. As device inlet, the system block 112 includes a first paint line connection 115, to which the paint pump 504 is connected, and as device outlet a second paint line connection 116, to which the spray head 506 is connected.

According to a realization variant which is not shown, the pulsation damping system is constructed in the paint pump or is directly connected to the paint pump.

With the pulsation damping system 101 operating, the paint 502 flows from the paint line connection 115—as can be seen better in FIG. 4—through a channel 117 up to a first distribute point 118 and is directed from the first distribute point into the two pulsation dampers 102, 103 which are connected in parallel. In this connection, only the path of the paint 502 through the first pulsation damper 102 is described below. Approximately half the volume of the paint stream 507 flows from the distribute point 118 through the chamber inlet 106 into the chamber 105 and from there further through the chamber outlet 107 into a first collect point 119 and from the first collect point by means of a second channel 120 of the system block 112 to the second paint line connection 116, to which the spray head 506 is connected by means of the second portion 505b of the paint hose 505 (see also FIG. 3). The pulsation damping effect is brought about by means as a result of a flexible action and a damping action which unfolds the diaphragm along the paint stream. Responsible for the flexible action first and foremost is the spring means 154 which supports the diaphragm. Responsible for the damping action first and foremost is the damper 155 which is located in the spring and damping area 153 together with the spring means 154.

The already mentioned second pulsation damper 103 is realized in an analogous manner to the first pulsation damper 102 such that the paint stream 507 running through the pulsation damping system 101 emerges out of the pulsation damping system 101 fully treated.

FIGS. 2 to 6 show another filter 121 as an optional component. A filter 121 is connected to the channel 117 by means of a second distribute point 122 which is arranged in front of the first distribute point 118 in the direction of flow x. The entire paint stream 507 is guided through the filter 121 and then re-enters into the first channel 117 by means of a second collect point 123, which is arranged in the first channel 117 between the second distribute point 122 and the first distribute point 118. In this connection, the channel 117 is closed between the second distribute point 122 and the second collect point 123 such that the entire paint stream is guided through the filter 121. The filter 121 is screwed into a filter flange 124 of the system block 112 by way of a lower end 125 of its filter housing 126 such that it is able to be replaced in a rapid manner.

According to a realization variant not shown, it is also provided to arrange a second filter located opposite the first filter, the system block then including a further filter flange for the second filter and the filter, connected in parallel to the first filter, also being connected to the second distribute point and the second collect point.

As can be seen from FIG. 3, the system block 112 comprises four through-bores 127, 128, 129 and 130, through which the covers 112a, 112b are screw-connected by way of connecting means 131, 132, 133 and 134 in such a manner in relation to one another that the covers 112a, 112b close the chambers 105. The connecting means 131 to 134 are formed in each case by a screw and a nut or by a screw and an internal thread which is realized in one of the covers.

The pulsation damper 102 includes an adjusting device 159, by means of which a spring force F102 of the pulsation damper 102 is pre-adjustable. The adjusting device 159 is realized as a refilling device 160 which makes it possible to fill gas 601 into the spring and damping area 153 or to remove it from the area (see FIG. 4). The pulsation damper 103 also includes an adjusting device 162 which is realized as a refilling device 163 (see FIG. 3). The spring and damping area 153 is—as can also be seen in particular from FIG. 5—the area which is located between the diaphragm 150 and the cover 112a. In this connection, the porous plastics material body 157 forming the damper 155 is marked in the spring and damping area 153 and in this connection two gas bubbles 156a, 156b are marked above and below the damper 155 to symbolize the gas filling 156, gas also being situated in the porous plastics material body 157 such that the gas filling 156, when viewed in section, extends continuously from the upper gas bubble 156a via a central gas bubble 156c, which is formed substantially by the gas received in the porous plastics material body, to the lower gas bubble 156b. When viewed three-dimensionally, the gas filling 156 is consequently realized similarly to the diaphragm 150 in a disk-shaped manner.

According to a realization variant not shown where a pre-tensionable helical spring or cup spring as spring means supports the diaphragm, it is provided to realize an adjusting device as a drive shaft, by means of which the pre-tensioning of the helical spring or of the cup spring is able to be increased or reduced by means of an adjustable thrust bearing.

The two pulsation dampers 102 and 103 are connected in parallel to one another in the paint stream 507 such that a first part of the paint stream flows against the diaphragm 150 of the first pulsation damper 102 and a second part of the paint stream flows against a diaphragm 161 of the second pulsation damper 103, the two parts of the paint stream being approximately the same size and together forming the complete paint stream (see FIG. 5).

As can be seen in particular from FIG. 5, the two pulsation dampers 102 and 103 are arranged symmetrically with respect to one another and are located opposite one another such that the diaphragms 150, 161 thereof are located in parallel planes E150 and E161.

It can be seen additionally from FIG. 5 that the diaphragms 150 and 161 comprise a channel 164 or 165 in the form of a groove in a central region M150 or M161, by way of which, when the paint stream 507 has a small amount of pressure, they also abut, where applicable, against the chamber inlet 106 and against the chamber outlet 107 (see also FIG. 2). In this connection, the channel connects the chamber inlet 106 to the chamber outlet 107. Consequently, it is not possible for the diaphragm 150 or 161 to close the pulsation dampers 102 or 103.

The development of the channels 117 and 120 can be seen again in FIG. 6, the paint only being able to flow from the channel 117 into the channel 120 as a result of it running through the filter 121, insofar as it has been constructed, and the pulsation damper. In this connection, only the pulsation damper 103 can be seen in the sectional representation in FIG. 6.

Figure 7:
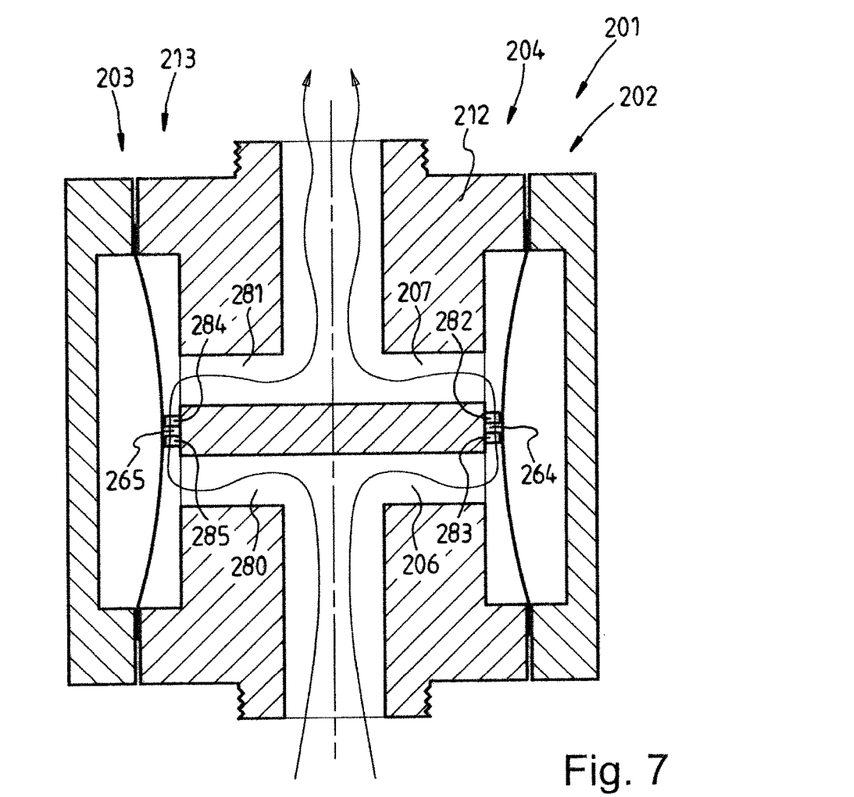
FIG. 7 shows a schematic representation of a third realization variant of a pulsation damping system.

FIG. 7 shows a schematic sectional view of a third realization variant of a pulsation damping system 201. This is constructed in a comparable manner to the pulsation damping system in FIGS. 2 to 6. In contrast to the pulsation damping system, channels 264, 265 of the first pulsation damper 202 and of the second pulsation damper 203 are formed as a result of being formed on the housing 204 or on the housing 213 and more precisely on the system block 212 which is associated with the two housings 204, 213, in each case between the chamber inlet 206 and the chamber outlet 207 or the chamber inlet 280 and the chamber outlet 281. In this connection, the channels 264, 265 are in each case formed by nubs 282, 283 or 284, 285 which stand out from the system block 212 and the space produced between the nubs.

Figure 8:
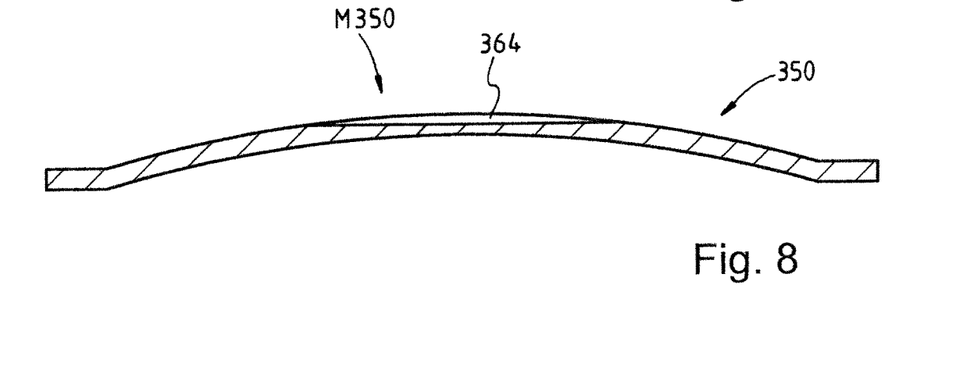
FIG. 8 shows a schematic sectional representation of a diaphragm for a fourth realization variant of a pulsation damping system and FIG. 9 shows a schematic sectional representation of a fifth realization variant of a pulsation damping system.

FIG. 8 shows of a schematic sectional view of a side view of a diaphragm 350 which comprises a channel 364 in a central region M350.

Figure 9:
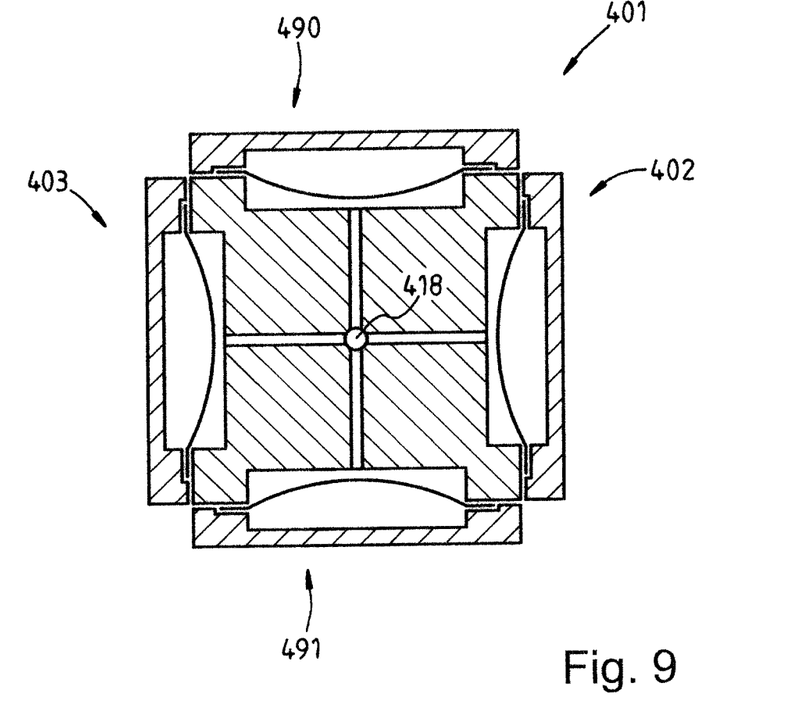

FIG. 9 shows a schematic sectional view of a fourth realization variant of a pulsation damping system 401. The pulsation damping system 401 is realized in a cuboid manner and includes four pulsation dampers 402, 403, 490,

491. A pulsation damping system with three pulsation dampers is formed as a result of one of the four pulsation dampers being omitted. To this end, it is provided in particular to close the corresponding connections in the system block by closure means. Consequently, it is also possible to fit the fourth pulsation damper in retro where required. A first distribute point 418, which distributes a paint stream 507 to the pulsation dampers 402, 403, 490, 491, can also be seen in FIG. 9. Deeper in the drawing plane there is then a collect point by means of which the paint stream is guided out of the pulsation dampers 402, 403, 490, 491 together.

In the case of all the realization variants of the pulsation damping system which include two pulsation dampers, an extension of the potential influences on the paint stream is also provided. To this end, the pulsation damping system is realized in such a manner that at least two pulsation dampers comprise different characteristic values, as a result of their characteristic differences, the pulsation dampers influencing the paint stream in different ways in a damping and/or flexible manner. In this connection, for obtaining different characteristic values of the pulsation dampers it is provided to equip the pulsation dampers, in particular, with different cross sectional areas at the chamber inlet and/or chamber outlet and/or to equip the pulsation dampers, in particular, with differently adjusted and/or designed spring means and/or dampers and/or to equip the pulsation dampers, in particular, with differently realized diaphragms and/or to equip the pulsation dampers, in particular, with differently sized paint areas and/or spring and damping areas. In this connection, to obtain different characteristic values it is provided, in particular, to adjust the adjusting means of the first pulsation damper in a manner deviating from the adjusting means of the second pulsation damper.

LIST OF REFERENCES

1 Pulsation damping system
2 First right-hand pulsation damper
3 Second left-hand pulsation damper
4 Housing
5 Chamber
6 Chamber inlet
7 Chamber outlet
8 Damping means
9 Opening of 7
9a Throttle nozzle
9b Passage
9c Internal thread
10 Opening of 6
11 Throttle
12 System block
12a Cover of 2
12b Cover of 3
13 Housing of 3
14 Not occupied
15 First paint line connection of 12
16 Second paint line connection of 12
17 Channel from 15 to 18
18 First distribute point
19 First collect point
20 Second channel from 19 to 16
21 Filter
22 Second distribute point
23 Second collect point
24 Filter flange
Lower end of 21
Filter housing of 21
27-30 Through bore in 12
31-34 Connection means through 27-30
101 Pulsation damping system
102 First right-hand pulsation damper
103 Second left-hand pulsation damper
104 Housing
105 Chamber
106 Chamber inlet
107 Chamber outlet
108 Damping means
109 Opening of 7
110 Opening of 6
111 Throttle
112 System block
112a Cover of 2
112b Cover of 3
113 Housing of 3
114 Not occupied
115 First paint line connection of 12
116 Second paint line connection of 12
117 Channel from 15 to 18
118 First distribute point
119 First collect point
120 Second channel from 19 to 16
121 Filter
122 Second distributor
123 Second collect point
124 Filter flange
125 Lower end of 21
126 Filter housing of 21
127-130 Through bore in 12
131-134 Connection means through 27-30
150 Diaphragm of 102
151 Paint area
152 Not occupied
153 Spring and damping area
154 Spring means
155 Damper
156 Gas filling
156a Upper gas bubble
156b Central gas bubble
156c Bottom gas bubble
157 Porous plastics material body
158 Deflector face of 150
159 Adjusting device
160 Refilling device
161 Diaphragm of 103
162 Adjusting device
163 Refilling device
164 Channel on 105
165 Channel on 161
201 Pulsation damping system,
202 First pulsation damper
203 Second left-hand pulsation damper
204 Housing 204
206 Chamber inlet 206
207 Chamber outlet 207
212 System block 212
213 Housing 213
264,265 Channel
280 Chamber inlet 280
281 Chamber outlet 281
282,283 Nub
284,285 Nub
350 Diaphragm
401 Channel
401 Pulsation damping system 402,403 Pulsation damper
418 First distribute point
490,491 Pulsation damper
501 Paint spray device
502 Paint
503 Paint container
504 Paint pump
505 Paint hose
505a First portion of 505
505b Second portion of 505
506 Spray head
507 Paint stream
601 Gas
A9 Cross sectional area of 9
A109 Cross sectional area of 109
A10 Cross sectional area of 10
A110 Cross sectional area of 110
E150 Plane of 150
E161 Plane of 161
F102 Spring force of 102
L106 Longitudinal axis of 106
L107 Longitudinal axis of 107
M150 Central region of 150
M161 Central region of 161
M350 Central region of 350
S150 Symmetry axis of 150
V5 Volume of 5
V105 Volume of 105
X Direction of flow

The invention claimed is:

1. A pulsation damping system for a paint spray device for spraying paint including a pulsation damper for damping the pulsation of a paint stream, wherein the pulsation damper includes
   a housing, a chamber, a chamber inlet, a chamber outlet, a damping means and a diaphragm that divides the chamber into a paint area, which is traversed by paint and a spring and damping area, wherein the chamber inlet and the chamber outlet are connected to the paint area, and
   wherein an opening of the chamber outlet comprises a cross sectional area which is smaller than a cross sectional area of an opening of the chamber inlet, and as a result forms a throttle.

2. The pulsation damping system according to claim 1, wherein the cross sectional area of the opening of the chamber outlet is at least 50% smaller than the cross sectional area of the opening of the chamber inlet.

3. The pulsation damping system according to claim 1, wherein the spring and damping area includes at least one of a spring means and a damper.

4. The pulsation damping system according to claim 1, wherein the diaphragm is a disk-shaped diaphragm.

5. The pulsation damping system according to claim 1, wherein the chamber inlet and the chamber outlet are connected by a channel which is in connection with at least one of the diaphragm and the housing such that a passage for paint is present through the chamber irrespective of the position of the diaphragm, or in a manner that is not able to be blocked by the diaphragm.

6. The pulsation damping system according to claim 1, wherein the pulsation damper includes an adjusting device, by means of which a spring force of the pulsation damper is pre-adjustable.

7. The pulsation damping system according to claim 1, further comprising a second pulsation damper, wherein the second pulsation damper also includes a housing, a chamber, a chamber inlet, a chamber outlet and a damping means.

8. The pulsation damping system according to claim 7, further comprising at least three pulsation dampers, wherein the third pulsation damper and each further pulsation damper also includes a housing, a chamber, a chamber inlet, a chamber outlet and a damping means.

9. The pulsation damping system according to claim 8, wherein the pulsation dampers are incorporated into the paint stream in parallel with one another.

10. The pulsation damping system according to claim 8, further comprising a first paint line connection, a distribution point, a collection point and a second paint line connection,
    wherein the chamber inlet of the first pulsation damper and the chamber inlet of each further pulsation damper are connected to the first distribution point, and
    wherein the chamber outlet of the first pulsation damper and the chamber outlet of each further pulsation damper are connected to the first collection point.

11. The pulsation damping system according to claim 10, further comprising a second distribution point and a second collection point,
    wherein a filter inlet of at least one filter is connected to the second distribution point, and
    wherein a filter outlet of the at least one filter is connected to the second collection point.

12. The pulsation damping system according to claim 8, wherein the pulsation dampers are arranged symmetrically with one another.

13. A paint spray device including a paint container, a paint pump, a paint hose, a spray head and a pulsation damping system according to claim 1.

14. The paint spray device according to claim 13, wherein the pulsation damping system is arranged between the paint pump and the paint hose.

15. The pulsation damping system according to claim 4, wherein the damper is an open-pore or closed-pore plastic material body.

16. The pulsation damping system according to claim 15, wherein the damper is a foam material or a rubber body.

17. The pulsation damping system according to claim 12, wherein the pulsation dampers are located opposite one another.

18. The pulsation damping system according to claim 3, wherein the spring means includes at least one of a gas filling and a mechanical spring, and wherein the damper includes a plastic material which absorbs pressure energy.

* * * * *